(12) United States Patent
Schalk (10) Patent No.: US 8,990,779 B2
(45) Date of Patent: Mar. 24, 2015

(54) RESPONSE TIME MEASUREMENT SYSTEM AND METHOD

(75) Inventor: Michael Schalk, Leingarten (DE)

(73) Assignee: SAP SE, Walldorf (DE)

( * ) Notice: Subject to any disclaimer, the term of this patent is extended or adjusted under 35 U.S.C. 154(b) by 916 days.

(21) Appl. No.: 12/539,371

(22) Filed: Aug. 11, 2009

(65) Prior Publication Data

US 2011/0041121 A1 Feb. 17, 2011

(51) Int. Cl.
*G06F 9/44* (2006.01)
*G06F 9/45* (2006.01)
*G06F 11/36* (2006.01)
*G06F 9/445* (2006.01)

(52) U.S. Cl.
CPC ............ *G06F 11/3616* (2013.01); *G06F 8/316* (2013.01); *G06F 9/44521* (2013.01)
USPC .......................................... 717/127; 717/140

(58) Field of Classification Search
CPC .. G06F 9/44521; G06F 8/316; G06F 11/3616
USPC ................................................. 717/127, 140
See application file for complete search history.

(56) References Cited

U.S. PATENT DOCUMENTS

| | | | | |
|---|---|---|---|---|
| 4,720,778 A | * | 1/1988 | Hall et al. | .................... 714/38.12 |
| 6,311,327 B1 | * | 10/2001 | O'Brien et al. | ................ 717/114 |
| 6,442,750 B1 | | 8/2002 | Lopes et al. | |
| 6,467,086 B1 | | 10/2002 | Kiczales et al. | |
| 6,473,895 B1 | | 10/2002 | Lopes et al. | |
| 6,748,555 B1 | * | 6/2004 | Teegan et al. | ............... 714/38.12 |
| 7,225,361 B2 | | 5/2007 | Cobb et al. | |
| 7,631,073 B2 | * | 12/2009 | Chagoly et al. | ................ 709/224 |
| 8,225,291 B2 | * | 7/2012 | Chung et al. | .................... 717/125 |
| 2004/0205712 A1 | * | 10/2004 | Holzle et al. | ................... 717/118 |
| 2006/0167891 A1 | * | 7/2006 | Blaisdell et al. | ................ 707/10 |
| 2007/0143323 A1 | | 6/2007 | Vanrenen et al. | |
| 2007/0143743 A1 | | 6/2007 | Cobb et al. | |
| 2007/0169052 A1 | | 7/2007 | Vanrenen et al. | |
| 2008/0127149 A1 | * | 5/2008 | Kosche et al. | ................ 717/158 |
| 2009/0276762 A1 | * | 11/2009 | Ponitsch | ........................ 717/127 |
| 2010/0180255 A1 | * | 7/2010 | Chung et al. | ................... 717/110 |
| 2013/0125096 A1 | * | 5/2013 | Kruetzfeldt et al. | ........... 717/130 |

FOREIGN PATENT DOCUMENTS

WO WO 2005/096146 A1 * 10/2005 ................ G06F 9/44

OTHER PUBLICATIONS

Haupt et al., Micro-measurements for Dynamic Aspect-Oriented Systems M. Weske and P. Liggesmeyer (Eds.): NODe 2004, LNCS 3263, pp. 81-96, 2004. [online], [retreived on Apr. 17, 2012 from SpringerLink Computer Science Database at <URL: http://www.springerlink.com/content/glhpf99cg2xkgc8h/fulltext.pdf>].*

(Continued)

*Primary Examiner* — Eric Oberly (57) ABSTRACT

Embodiments of the present invention relate to a computer-implemented method that includes binary weaving a second computer program code into the byte code of a first computer program code using a code weaver to form a third program product with a plurality of time measurement points. The programs can include sending a request via a network requesting information from a server computer system. The embodiment of the present invention may include measuring the execution time between the execution of a start point to the execution of a corresponding stop point.

19 Claims, 7 Drawing Sheets

(56) References Cited

OTHER PUBLICATIONS

Aspect Development Enviroment Guide, ajc, the AspectJ compiler/weaver, Chapter 2, AspecJ command-line tools, [online], Retreived on Apr. 21, 2009 at <URL:http://www.eclipse.org/aspectj/doc/released/devguide/ajc-ref.html>.*

Usui, Yoshiyuki et al.; Bugdel: An Aspect-Oriented Debugging System; APSEC'05, IEEE, Copyright 2005.*

Xerox Corporation; The AspectJ™ Development Environment Guide; 1998-2001; Palo Alto; Retrieved on Aug. 6, 2009: http://www.eclipse.org/aspectj/doc/released/devguide/index.html.

Aspectj Development Environment Guide, Chapter 5. Load-Time Weaving, Retrieved on Aug. 6, 2009: http://www.eclipse.org/aspectj/doc/released/devguide/ltw.html.

Aspectj Development Environment Guide, Load-time Weaving Requirements Chapter 5. Load-Time Weaving, Retrieved on Aug. 6, 2009: http://www.eclipse.org/aspectj/doc/released/devguide/ltw-rules.html.

Aspectj Development Environment Guide, Configuration Chapter 5. Load-Time Weaving, Retrieved on Aug. 6, 2009: http://www.eclipse.org/aspectj/doc/released/devguide/ltw-configuration.html.

Aspectj Development Environment Guide, Special cases Chapter 5. Load-Time Weaving, on Aug. 6, 2009: http://www.eclipse.org/aspectj/doc/released/devguided/ltw-specialcases.html.

Aspectj Development Environment Guide, Runtime Requirements for Load-time Weaving Chapter 5. Load-Time Weaving, Retrieved on Aug. 6, 2009: http://www.eclipse.org/aspectj/doc/released/devguide/ltw-packaging.html.

Aspectj Development Environment Guide, Supported Agents Chapter 5. Load-Time Weaving, Retrieved on Aug. 6, 2009: http://www.eclipse.org/aspectj/doc/released/devguide/ltw-agents.html.

Wily Technology, Wily Technology's Byte Code Instrumentation Technology Adopted as Industry Standard in J2SE™ 5.0, Brisbane, CA; Sep. 30, 2004; Retrieved Aug. 7, 2009: http://www.sun.com/aboutsun/media/presskits/tiger/WilyJ2SErelease.pdf.

* cited by examiner

RESPONSE TIME MEASUREMENT SYSTEM AND METHOD

BACKGROUND OF THE INVENTION

Modern software can be developed by teams of individuals each performing a different task during the software development cycle. For example, a group of individuals may design the software and another group of individuals write the code in a high level language and yet another group of individuals may be responsible for testing the application. Metrics such as response time measurements may be measured by testers to evaluate the performance of an application or the performance of portions of an application, for example, as compared to previous versions of the application.

SUMMARY OF THE INVENTION

Embodiments of the present invention may include a computer-implemented method for measuring response time of portions of a first computer program code stored on computer readable media. The method may include sending a communication from a first computer system to a second computer system requesting information. The first computer program code may be configured using a second computer program code to initiate a timer when the communication is initiated from the first computer system. Initiating a timer can include, storing or displaying a start and stop time. The method may include, calculating the response time after displaying a result of the information received from the second computer system. Calculating the response time may include, calculating the difference between the stop time and the start time. In this embodiment the response time may be stored in a log file.

Another embodiment of the present invention may include, a computer-implemented method for measuring response time of a first computer program code stored on computer readable media that uses load time weaving a second computer program code into the first computer program code using a compiler that transforms source code into language that a computer can execute. The second computer program code may be configured to define start and stop measurement points to measure the response time between the start and stop points in the first computer program code. Measuring the response time may include, calculating the difference between the stop measurement point and the start measurement point. The method may include storing the measured response time in a log file when the second computer program code is executed.

Another embodiment of the present invention may include, a computer-implemented method for measuring the response time of a first computer code product stored on computer readable media including, binary weaving a second computer program code into the first computer program code using a binary code weaver to form a third program product with a start point and a stop point. The weaving may comprise combining at least two computer program codes to form one computer program code that includes code from both computer program codes. Combining the at least two computer program codes may include, modifying the execution sequence of at least one of the computer program codes. Embodiment of the present invention include the execution of the third program product between the start point and the stop point sending a request via a network requesting information from a server computer system. An embodiment of the present invention includes measuring the time between the execution of one start point to the execution of a corresponding stop point. The measuring may include, storing a first timestamp when the start point is executed into a log file, storing a second timestamp when the stop point is executed into the log file and accessing the log file and calculating the difference between the start timestamp and the end timestamp in the trace file and storing the result.

DETAILED DESCRIPTION OF EXAMPLE EMBODIMENTS

Figure 1:
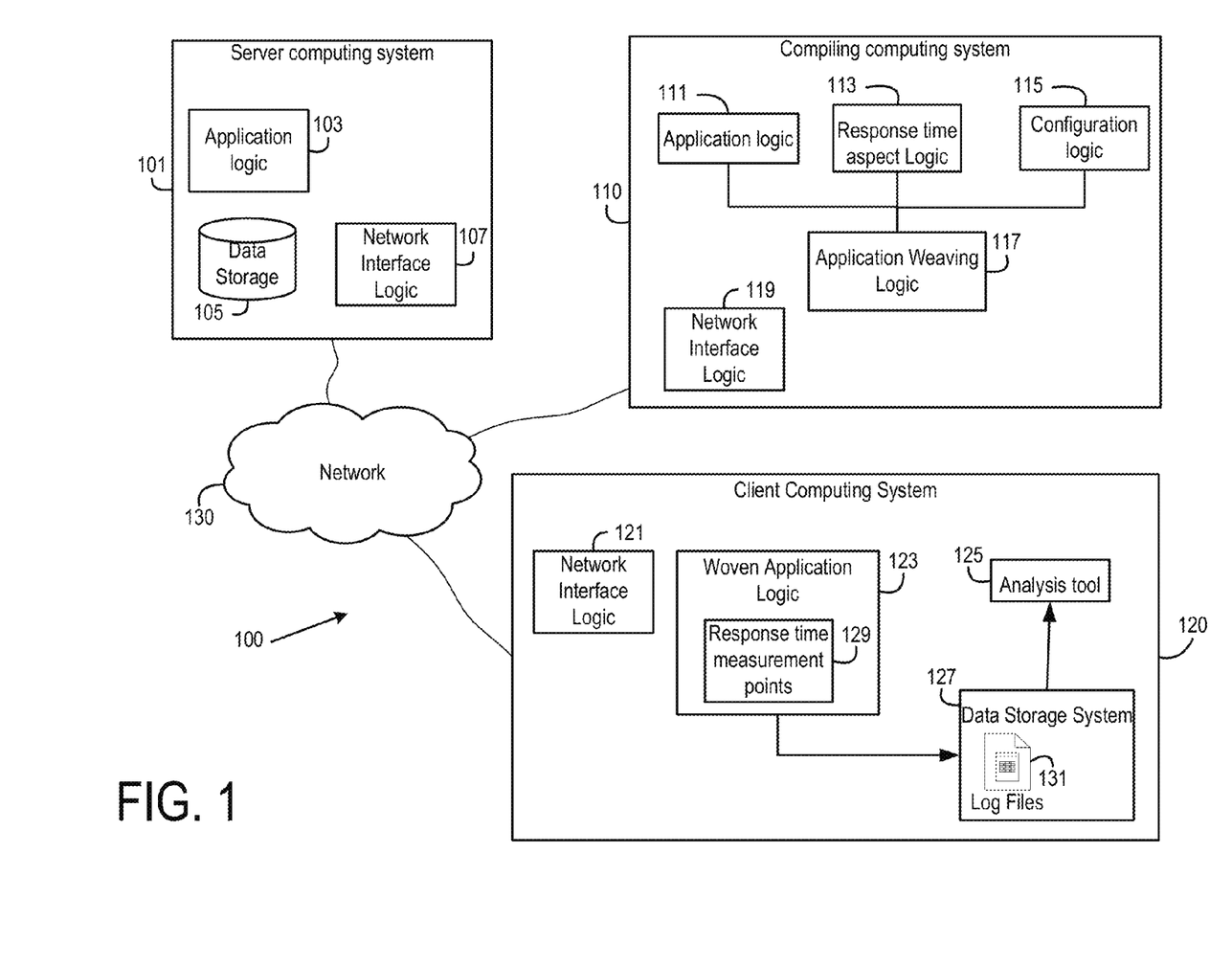
FIG. 1 is a schematic diagram of a data processing system according to an embodiment of the present invention.

Referring to FIG. 1, FIG. 1 shows a schematic diagram of a system 100 according to an example embodiment of the present invention. The system 100 may include a server computing system 101, a development computer system 110, and a client computing system 120. In an example embodiment, the server computing system 101 and the development computer system 110 may be a single computing system or several computing systems that may be connected via a network. Similarly, in another example embodiment, the development computing system 110 and the client computing system 120 may be implemented on a single computing system or several computing systems that may be connected via a network.

The server computing system 101 may include, among other systems, application logic 103, and data storage system 105. The server computing system 101 may include server-based computing systems, for example, comprising one or more networked computer servers that are programmed to perform the operations described herein. These operations include computing and/or communicating with the client computing system 120. Communication may include receiving requests, processing the requests, and sending an appropriate response to the client computing system 120 or updating the data storage system 105.

In an example embodiment, the server computing system 101 and the development computer system 110 may be provided by a software company. In another embodiment, the server computing system 101 and the client computing system may be provided by an entity that uses software provided by a software company, other combinations are also possible. The development computing system 110 may comprise various application logics and assemble various programs to form one or more byte code programs that may be sent to the server computing system 101 and the client computing system 120. The embodiments of the present invention may be applied in various situations. For example, a tester at a product development company may simulate a client computing system 120 to initially evaluate the performance of the application during development. In another example, a customer of a product development company may receive the woven application, execute the woven application, and send data back to the development company to evaluate and track the performance of the application. Another example may be where the customer of the product development company reports a problem with the application. The application provider may be able to create customized response time aspect logic 113 using the configuration logic 115 and upload a woven application to the customer with the problem. Upon the execution of the woven application, the application provider may upload the response times to determine which portion of the application is causing delays. For example, response time measurement start and stop points may be used to identify if the client computing system 120 is slow, network speed is slow, or if the server is slow. The response time measurement start and stop points may include, determining the response time for code executed on both the client computing system 120 and the server computing system 101. The appropriate placement of the start and stop point using the configuration tool can enable efficient troubleshooting of the application.

In an example embodiment, the development computing system 110 may include, application logic 111, response time aspect logic 113, configuration logic 115, application weaving logic 117, and network interface logic 119. Such logic may, in practice, be implemented in a machine (e.g., one or more servers and other computers) comprising machine-readable storage media (i.e. cache, memory, flash drive or internal or external hard drive or in a cloud computing environment) having instructions stored therein which are executed by the machine to perform the operations described herein. The application logic 111 may be a program product received from the developers of an application to be tested for response time. The response time aspect logic 113 may be a program product that allows a tester to place response time measurement start and stop points into the application logic 111. The configuration logic 115 offers the tester a graphical user interface tool that receives input regarding where in the application to insert the start and stop time measurement points. The configuration logic 115 may be configured to permit the tester to specify where to insert the start and stop time measurement points into the byte code of the application logic 111. An example response time measurement may include starting a timer at a start point and stopping the timer at a stop point. However, in other examples, a user nay specify multiple start and stop points, such as nested start and stop points. For example, in a nested implementation, a timer may be started at the start of an application, other timers may be repeatedly started and stopped while the application is running, and lastly the timer that was started at the start of the application may be stopped. As another example, timers may be started and stopped in serial to assess how much time is required for various portions of the code to execute. Although timer start and stop points are described herein, other methods for measuring response time may be used to implement a timer. These features are discussed in greater detail below with reference to FIGS. 6 and 7.

The application weaving logic 117 can assemble or compile the code provided by the application logic 111, the response time aspect logic 113, and the configuration logic 115. The configuration logic 115 may be configured to receive program instructions from application logic 111 and response time aspect logic 113 to create a woven application logic 123. The weaving logic 117 assembles the code according to the configuration specified by the user using the configuration logic 115. The weaving logic 117 can comprise at least one of a compile-time weaver, a binary weaver or a load-time weaver. A compile time weaver can receive the source code of an application the characteristics of which can be modified by aspects (Aspect Oriented Programming) into a new class file (woven application logic 123).

The response time aspect logic 113 is an aspect. An aspect is a program module that may change, modify or adds characteristics or functionality to other programs or objects that may be known as the base programs (e.g., here, application logic 111). Each aspect may comprise cross-cuts and cross-cut actions. The cross-cuts may define a plurality of points (e.g., here the start and stop points) in the base computer program code where the cross-cut action will be applied. The cross-cut action is the action that occurs at a cross-cut point. The weaving logic 117 may create new computer program code that includes the cross-cut actions inserted into the base program for execution. Weaving may modify the execution sequence of the base program to include the aspect program module. The use of aspects and weaving may allow a programmer that is familiar with high level details of the base program to modify the base program sequence without introducing new errors into the base programs.

The aspect code may be in high-level programming language, byte code or binary form. A binary weaver may be used on existing class files and JAR files (files that aggregate many files into one). As with compile-time weaver the aspects used for weaving may be in source code or binary code form, and may themselves be woven by aspects. Lastly, load-time weaving is binary weaving deferred until the point that a class loader loads a class file and defines the class to a virtual machine. To support load time weaving, one or more weaving class loaders either provided explicitly by the run time environment or enabled through a weaving agent may be used.

Byte code refers to code that may be executed by a virtual machine. A virtual machine is a set of computer software program and data structures that execute other computer programs and scripts. Virtual machines such as the Java Virtual machine or Java runtime environment (JRE) can provide various services to an application by issuing commands and receiving the expected results taking place of an operating system or hardware. Binary code can refer to code that can be executed by the hardware of a machine.

In an example embodiment, load time weaving may be used when only the byte code of an application is available. An example application weaving logic 117 may comprise using an AspectJ weaving agent. Weaving may include combining at least two computer program codes to form one computer program code that includes code from both computer program codes. Combining the program code of at least two programs may modify the code execution sequence. The AspectJ weaving agent is an extension of the Java programming language. In an AspectJ weaving agent, the object code may be encapsulated in Java classes, and aspect code is encapsulated in special program modules, called "aspects."

The client computing system 120 may include, network interface logic 121, woven application logic 123, and data storage system 127. Such logics may, in practice, be implemented in a machine (e.g., one or more computers or servers) comprising machine-readable storage media (i.e. cache, memory, flash drive or internal or external hard drive or in a cloud computing environment) having instructions stored therein which are executed by the machine to perform the operations described herein.

The woven application logic 123 may comprise the application logic 111 and the response time measurement points 129. For example, the client computing system 120 may receive the woven application logic 123 with the response time measurement points 129. During the execution of the woven application logic 123, the woven application logic 123 executes code representing a start or stop point. In an example embodiment, the response time generated by the woven application logic 123 may be stored in the data storage system 127 which includes log files 131 that store the response time measurements for each start and stop point of the woven application logic 123. In another embodiment, each start and stop point may be stored in individual log files 131, meaning that there may be a plurality of log files 131. Log files may be configured to show response times of particular functions, methods or display screens. The log files 131 can also be used by other tester tools to analyze the pattern, e.g., during regression testing, where due to fixing one error in the application another error may be in advertently introduced into the application. The tools used to analyze the log file may be configured to create a graph of each of the response times for each build of an application to show which changes in the application caused a change in response time. The analysis tool 125 may be configured to identify to a tester or a developer of the application which method, procedure or function increased the response time. The functionality of the analysis tool 125 may be accomplished by receiving and storing the response time in the log files 131 from different compilations of the application. The response time tool 125 may identify which version of the function or method, procedure, class or object has the best response time and thus may be used to generate an application using the optimal functions, methods, class or object with a reduced response time.

Network interface logic 107, 119, 121 may be used to connect the server computing system 101, development computer system 110 and the client computer system 120, respectively, to connect to the network 130. The network interface logic 107, 119 and 121 permit the computing systems 101, 110 and 120 to connect the each other and the other computer systems. For example, in the context of desktop/laptop computers, network interface logic 107, 119 and 121 may comprise one or more computers or web servers that provide a graphical user interface for users that access the subsystems of system 101, 110 or 120 through the internet or an intranet protocol. The graphical user interface may be used to prompt the user to provide login information, passwords and other authentication information. Network interface logic 107, 119 and 121 may also comprise other logic that is configured to provide an interface for other types of devices such mobile devices that includes cell phones, smart phones, and server-based computing systems.

Figure 2:
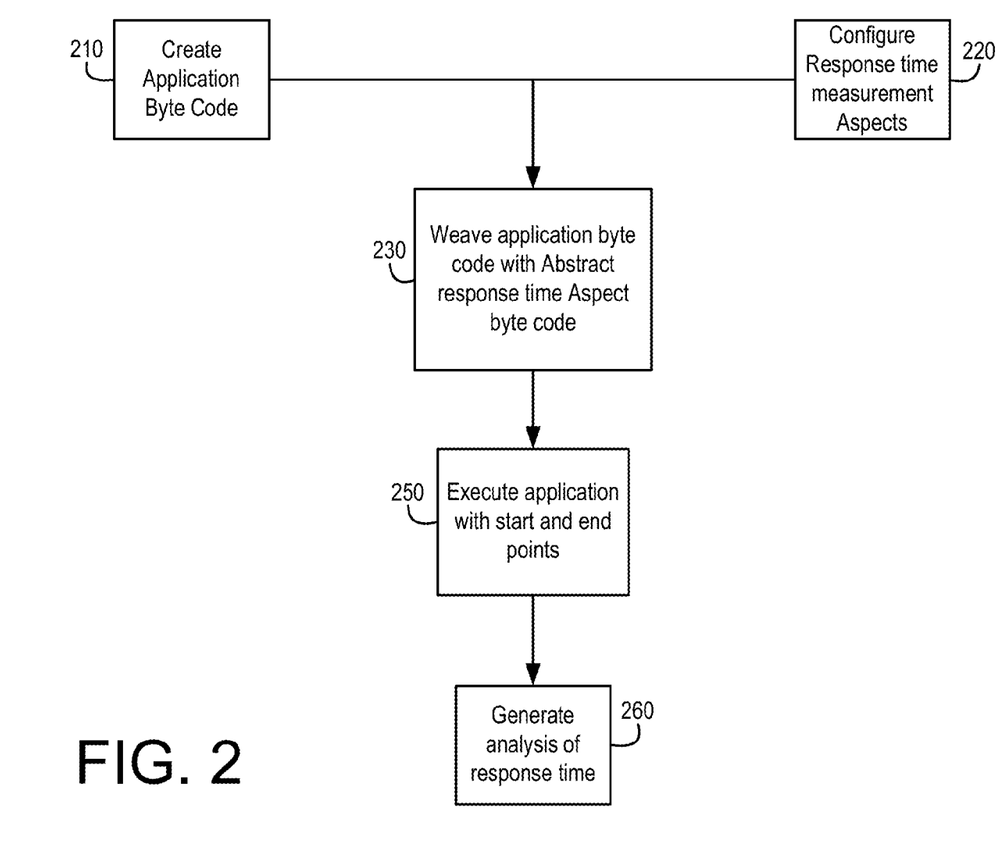
FIG. 2 is an example process that may be implemented using the system shown in FIG. 1.

Referring to FIG. 2, FIG. 2 is an example process that may be implemented using the system shown in FIG. 1 to measure response time. At step 210, the application byte code may be created using the development computer system 110. At step 220, the configuration logic 115 configures the response time measurement aspect that defines the start and stop points for measuring the response time, defines a response time handler class, configures the format of the time entries, and so on. A configuration tool 600 may receive input from a user to insert the start and stop points into the application byte code, as described in greater detail below in connection with FIG. 6. Next, at step 230, an application weaving logic 117 may weave the application byte code with the response time measurement aspects to create the woven application byte code and a concrete aspect byte code. At step 250, the woven byte code, the concrete response time aspect and the runtime byte code may be loaded in a class loader. After loading the application, the application may be executed with the start and stop points, at step 250. Next, at step 260, the analysis tool 125 receives the response times. The analysis tool 125 analyzes various response times from previous runs or builds to determine which objects, classes, functions or procedures of which version or run are most efficient. In another example embodiment, the analysis tool 125 may display the most efficient program product that may be compiled using portions of code from different versions of the application. In another example embodiment response time may be one of may parameters that may be simultaneously optimized (i.e., memory usage by a method, the amount of CPU time used, and so on.)

Figure 3:
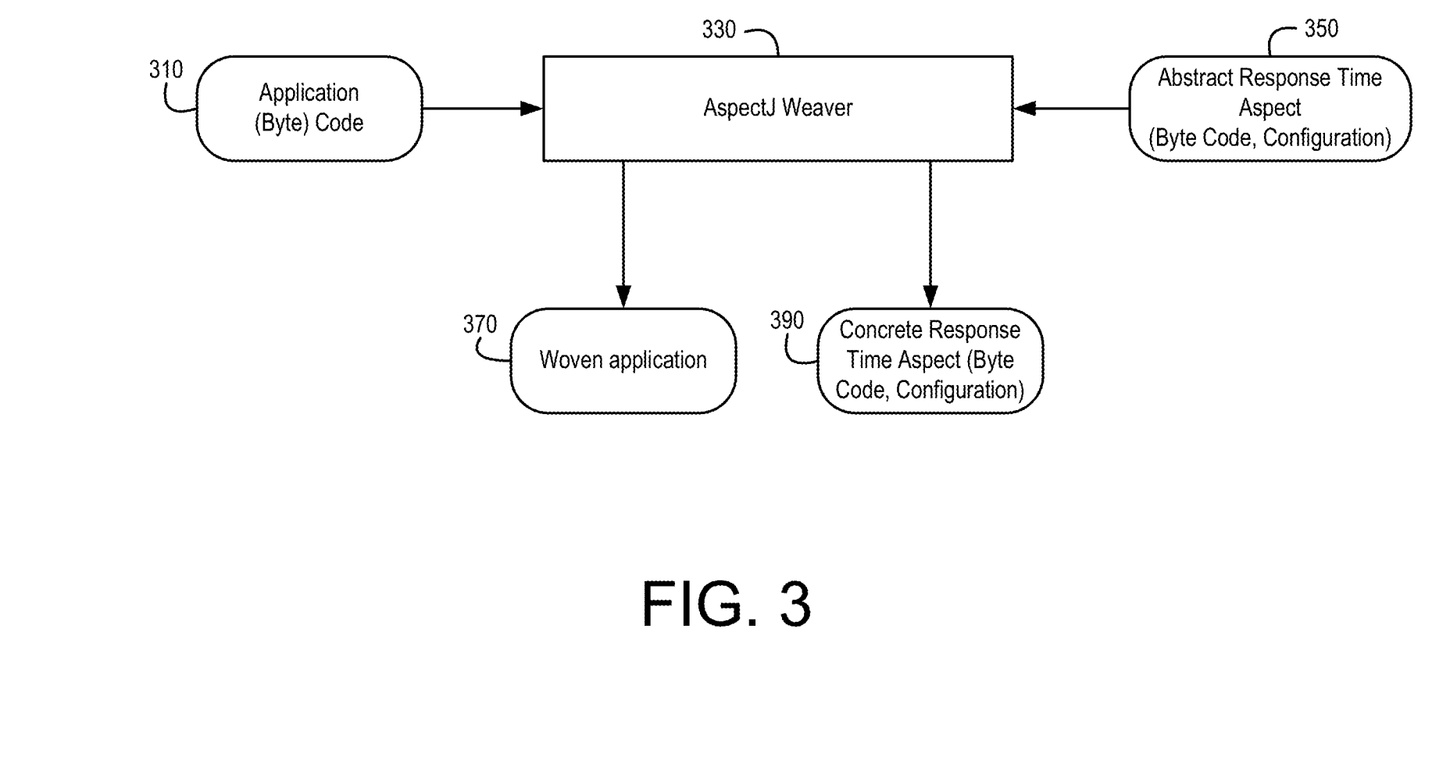
FIG. 3 is a load-time weaving operation that may be implemented using the system shown in FIG. 1.

Referring now to FIG. 3, FIG. 3 is a example load-time weaving operation that uses a system that may be implemented in FIG. 1. In particular, an AspectJ weaver 330 may receive as input, an application byte code 310 and an abstract response time aspect 350 that includes byte code and configuration settings. The AspectJ weaver 330 produces, a woven application 370 and a concrete response time aspect 390. The AspectJ weaver 330 may combine at least two computer program codes to form one computer program code that includes code from both computer program codes. Combining the at least two computer program codes may include, modifying the execution sequence of at least one computer program. The woven application 370 includes as part of its execution sequence start and stop points as defined by the abstract response time 350. The abstract response time aspect 350 may include a plurality of cross-cuts (i.e. startPoint and endPoint). The abstract response time aspect 350 may be programmed to place a start point time stamp and an endpoint time stamp in the application byte code 310. In general, the abstract response time 350 may be programmed to perform an action when the aspect is called. Unlike the abstract response time aspect 350, the concrete response time aspect 390 has start and stop points that are tied to a particular location or sequence in the execution of the woven application 370. The concrete response time aspect is called concrete because all the cross-cuts in it refer to concrete points in the woven application, i.e., all the crosscuts are bound to specific places in the object classes. This example embodiment describes an application that is written in Java or Java swing, however, other high level languages, may be used, such as C#, ASP, Java Script, C++, Objective-C and so on. This example embodiment uses an AspectJ weaver, however, other byte code or binary weavers or compilers such as Borland, GNU, and so on, may be used with appropriate languages.

Figure 4:
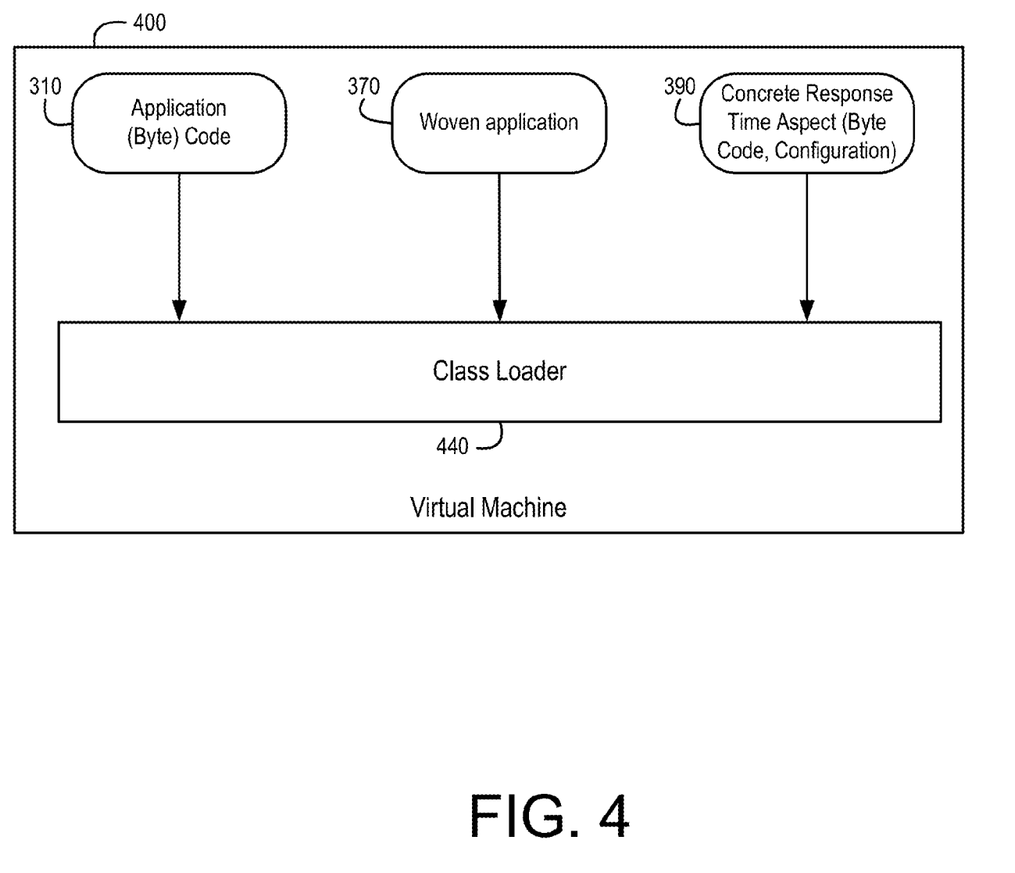
FIG. 4 is an example schematic diagram of a Java Virtual Machine that can load various class libraries.

Referring to FIG. 4, FIG. 4 is an example schematic diagram of a Virtual Machine 400 that loads various class libraries and executes the woven application 370. The virtual machine 400 includes a class loader 440 that receives as input the Application (byte) code 310, the woven application 370 and the concrete response time aspect 390. The classloader 440 may load classes into the virtual machine 440. Once loaded, the classes are executed by the virtual machine. In the present embodiment, the application sequence has been altered to include the start and stop timestamps using aspects.

Figure 5:
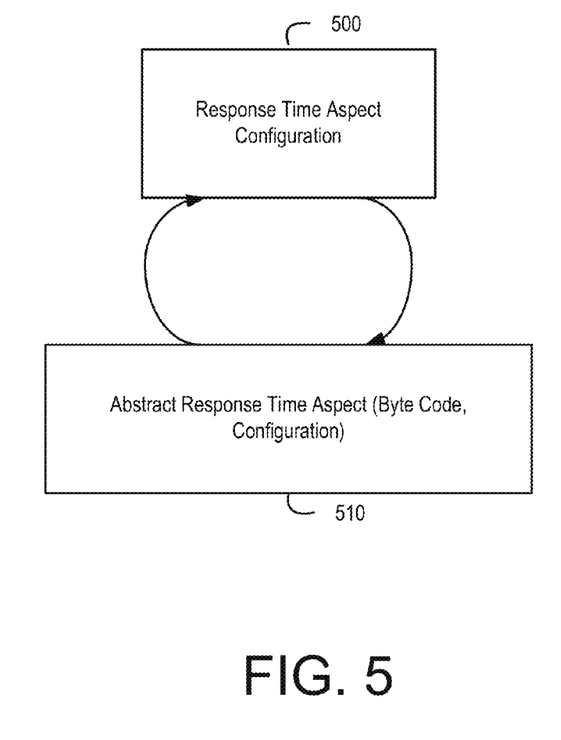
FIG. 5 is an example process that may be implemented between the configuration tool and the test time aspect program using the system shown in FIG. 1.

Referring to FIG. 5, FIG. 5 shows interaction between the response time aspect configuration 500 and the abstract response time aspect 510. The user may use the configuration logic 115 to modify the response time aspect configuration 500 and the aspect logic can generate the appropriate code to create the abstract response time aspect 510. The abstract response time aspect 510 may include both start and stop points to be programmed into a program, one example may be when a client computer that is running the application begins running function, class, object or procedure.

Figure 6:
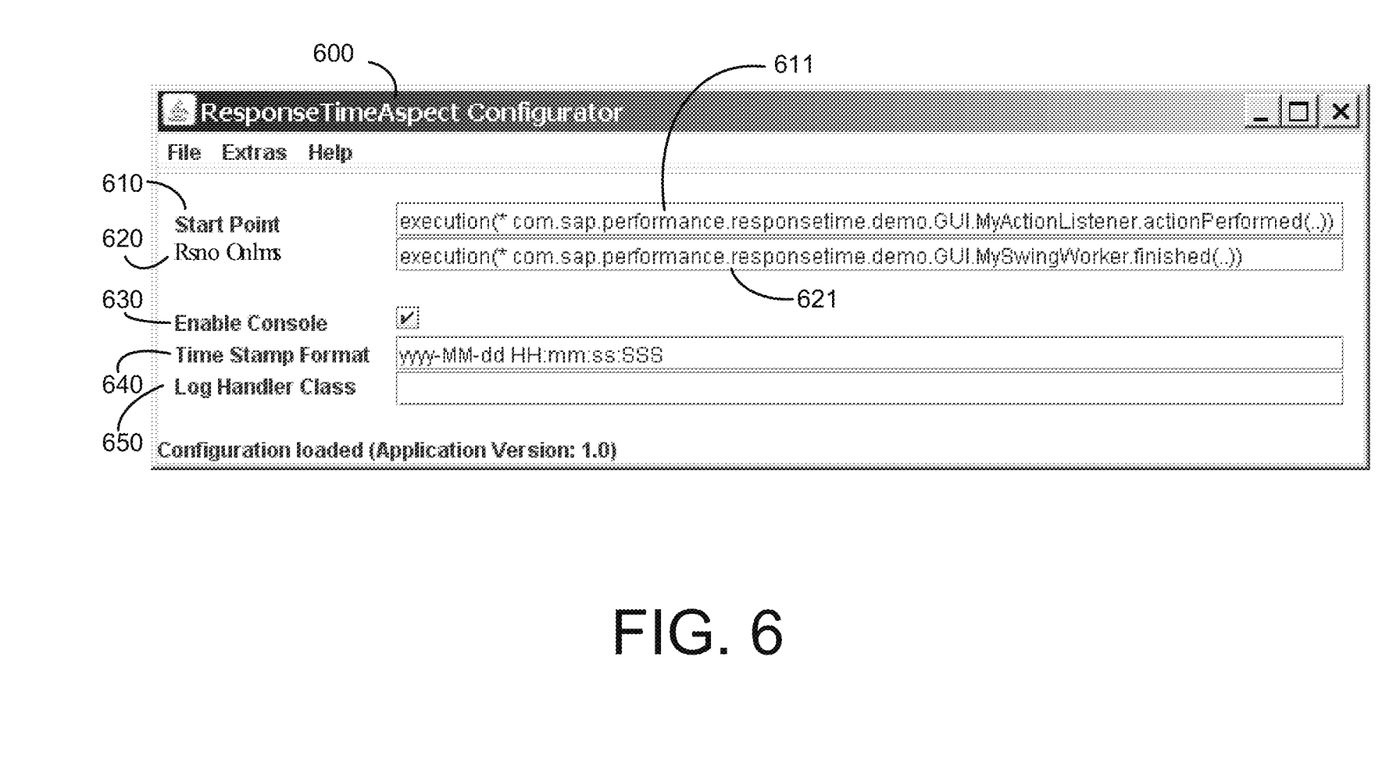
FIG. 6 is a screen display shown by the configuration tool that allows a user to define at least the start and stop points in an application for measuring the response time.

Referring to FIG. 6, FIG. 6 is a screen display that shows a response time aspect configurator 600 that receives as input from the user a start point 610, a stop point 620, an enable console checkbox 630, a time stamp format field 640 and a log handler class 650. As shown in FIG. 6, the user is provided with a text box where the user can enter the appropriate language code that refers to a plurality of locations in the application. For example, the start point 610 may specify the beginning of a function and the stop point 620 can refer to the end of a function. Example programming language code defining the location of the start point is shown in text box 611. Similarly, example code defining the location of the stop point is shown in text box 621. The text shown in text box 611 and 621 can be used to generate a configuration file. The configuration file may be analyzed by the AspectJ weaver to determine the actual location in the application for the placement of the response time measurement points. In an example embodiment, the configuration file may be an extensible mark up language format (XML). In other embodiments, the configuration file may be in a format that is user defined and consistent. In the example shown in FIG. 7, the configuration file is named META-INF/aop.xml. As will discussed in greater detail with regard to FIG. 7, the placement of the code in text box 611 and the code in text box 621 each generate a timestamp in the application byte code. The difference between the two timestamps represents the response time between the execution of the start point and the stop point.

Figure 7:
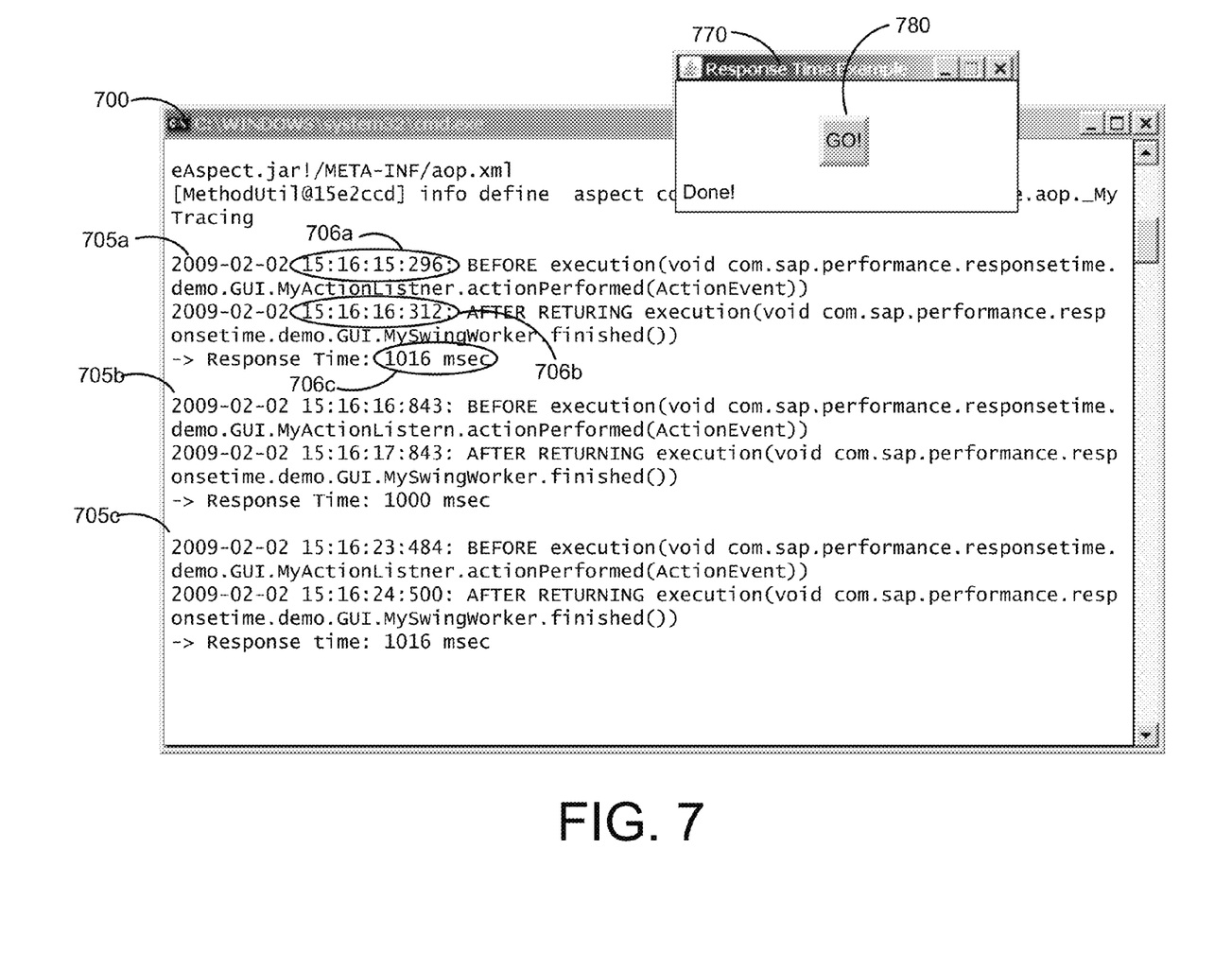
FIG. 7 is an example screen display showing the response times in a command prompt.

Check box 630 allows the user to enable a console. In an example embodiment, when the console option is enabled, the output from the response time measurement application may be shown on a display device. In another embodiment, when the console option is enabled, the output from the response time measurement application may be shown on a display device (as shown in FIG. 7 as discussed below) and may be stored in log files 131 based on the class specified in the log handler class field 650. If the checkbox 630 is not selected, then the output from the response time measurements can be sent to the log handler class file that can store the output in log files 131, forward the output to an analysis tool 125, or store the output in a data base depending on the customizations specified in the log handler class as specified by the user. The time stamp format field 640 permits the user to define whether the user wants the year, months, date, hours, seconds and sub seconds as shown in FIG. 6.

The log handler class field 650 specifies the output that is generated by the response time aspect. For example, as discussed above in an example embodiment, the handler class may analyze the results from previous compilations of the same software and identify which method, (or object out of which) build had the best response time and then the handler class may be configured to provide the user with options that identify various methods or objects the user can use to assemble an efficient functioning application. The log handler class field 650 allows the user to extend the default logging behavior of the tool and allows a user to customize the logging to the user's requirements. For example, the user may customize the results from the tool to be stored in a relational database, or the system may send the user an e-mail informing the user that a stop point or a plurality of stop points were reached. The extensibility of the log handler class allows the user of the tool to customize the response time analysis to a variety of options such as, graphing the response time results in a overlaid fashion to recognize patterns in a chronological manner or determining the most efficient build or identifying the slowest portions of an application.

Referring to FIG. 7, FIG. 7 shows an example console screen that shows output generated by the woven application logic 123. In this example embodiment, the console 700 displays three response time measurements 705a, 705b and 705c. For example in the response time measurement 705a, the start timestamp begins before the defined start point at time 706a. Likewise the stop point ends after the defined stop point at time 706b. The difference between the time 706b and time 706a is calculated as the response time 706c. The response time for response time measurements 705b and 705c can be calculated in a similar manner. The system 100 displays the line of code that was executed to trigger the stop point.

Also shown in FIG. 7 is the prompt 770 that shows an example application whose response time is being measured. The application shows a button 780, labeled GO!, that initiates the execution of the application and thereby may begin the response time measurements. That is, the next time a start point is reached, the start timestamp output is generated. Also, the next time a stop point is reached, the stop timestamp is generated and the difference between the start and the stop point is used to calculate the response time. Upon the execution of the example application, the prompt 770 can display text to the user informing the user that the program has completed execution.

The use of the aspect oriented programming (a programming model that uses aspects or program modules to modify other program modules) allows a tester or programmer to modify the application code without having to know the design of the application, only knowledge regarding the names of the methods and object is required by the tester. Another example of measuring response time may include measuring time on the client computing system to measure how long the server takes to respond. This type of measuring allows software engineers to measure the efficiency of a network application that may be implemented in a client/server model.

The embodiments of the present invention have been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products or logics comprising machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, mini-computers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing computers in the form of computers, including a processing unit, a system memory or database, and a system bus that couples various system components including the system memory to the processing unit. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. User interfaces, as described herein may include a computer with monitor, keyboard, a keypad, a mouse, joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention.

Throughout the specification, numerous advantages of the exemplary embodiments have been identified. It will be understood of course that it is possible to employ the teachings herein without necessarily achieving the same advantages. Additionally, although many features have been described in the context of a particular data processing unit, it will be appreciated that such features could also be implemented in the context of other hardware configurations.

While the exemplary embodiments illustrated in the figures and described above are presently preferred, it should be understood that these embodiments are offered by way of example only. Other embodiments may include, for example, structures with different data mapping or different data. The invention is not limited to a particular embodiment, but extends to various modifications, combinations, and permutations that nevertheless fall within the scope and spirit of the appended claims.

What is claimed is:

1. A computer-implemented method, comprising:
analyzing different code compilations of an application by receiving and storing response time data in one or more log files from the different code compilations of the application to determine a best code compilation from the different code compilations with a best response time to thereby generate the application using code corresponding to the best code compilation having the best response time, including:
sending a communication from a first computer system to a second computer system for each of the different code compilations of the application, the communication requesting information via a network for measuring a response time of portions of a first computer program code stored in memory for each of the different code compilations of the application;
configuring the first computer program code for each of the different code compilations of the application using a second computer program code to initiate a timer when a start point is reached in the first computer program code and the timer is stopped when a stop point is reached in the first computer program code, the second computer program code inserting high level language code into a byte code of the first computer program code for each of the different code compilations of the application to create a woven program product for each of the different code compilations of the application with the start and stop points based on receiving input from a user specifying where to insert the start and stop points into the byte code, and the code between the start and stop points sends the communication from the first computer system to the second computer system via the network;

displaying output generated by the woven program product for each of the different code compilations of the application to the user including a result of the information received from the second computer system related to the inserted start and stop points;

calculating the response time for each of the different code compilations of the application and displaying the calculated response time for each of the different code compilations of the application to the user after displaying the result of the information received from the second computer system, the response time comprising both a first computer system execution time and a second computer system execution time for measuring the first and second computer system execution times between execution of the start point to execution of the stop point; and storing the response time for each of the different code compilations of the application as the response time data in the one or more log files.

2. The method of claim 1, wherein the first computer system and the second computer system are coupled to each other in the client-server relationship, and wherein the first computer performs client operations in the client-server relationship and the second computer system performs server operations in the client-server relationship.

3. The method of claim 1, wherein initiating the timer comprises:
storing a start timestamp in a log file when the start point is reached in the first computer program code; and
storing a stop timestamp in a log file when the stop point is reached in the first computer program code.

4. The method of claim 3, wherein calculating the response time includes determining the difference between the stored stop and start timestamps.

5. The method of claim 1, wherein the stored start and stop points are embedded between other start and stop points to measure response times.

6. The method of claim 1, further comprising a response time analysis logic configured to determine the portions of the first computer program code with the fastest response time.

7. The method of claim 6, further comprising a response time analysis logic configured receive response time data to determine the response time difference since a previous version of the first computer program code with the fastest response time.

8. A computer-implemented method, comprising:
analyzing different code compilations of an application by receiving and storing response time data in one or more log files from the different code compilations of the application to determine a best code compilation from the different code compilations with a best response time to thereby generate the application using code corresponding to the best code compilation having the best response time, including:
load time weaving a second computer program code into a first computer program code stored in memory for each of the different code compilations of the application using a compiler that transforms source code into language that a computer is configured to execute, the second computer program code is configured as an abstract byte code, and the abstract byte code is inserted into an object class by use of the compiler to form a concrete response time byte code that is tied to a plurality of start and stop points in the first computer program code for each of the different code compilations of the application based on receiving input from a user specifying where to insert the start and stop points into the abstract byte code;
the second computer program code configured to define start and stop measurement points to measure the response time between the start and stop points in the first computer program code for each of the different code compilations of the application;
displaying output generated when the second computer program code is executed to the user including displaying information related to the inserted start and stop points to the user for each of the different code compilations of the application;
measuring the response time for each of the different code compilations of the application and displaying the measured response time for each of the different code compilations of the application to the user after displaying the information related to the inserted start and stop points to the user; and
storing the response time for each of the different code compilations of the application as the response time data in the one or more log files.

9. The method of claim 8, wherein the language that a computer is configured to execute comprises byte code that is a form of program instructions that a virtual machine is configured to execute.

10. The method of claim 9, wherein the virtual machine is a set of computer software program and data structures that execute other computer programs and scripts.

11. The method of claim 9, wherein load time weaving includes combining at least two software programs to form one program product that includes code from both software program, and wherein at least one program product includes response time start and stop measurement points.

12. The method of claim 9, wherein the compiler is a byte code weaver that takes as input a plurality of software programs and assembles the programs to produce byte code that is executable by a machine.

13. The method of claim 8, wherein the abstract byte code uses aspect-oriented programming (AOP) to allow crosscutting aspects to be inserted into the first computer program code.

14. The method of claim 13, wherein AOP allows a programmer to write an aspect that further defines or modifies various characteristics of at least one object in an application; wherein defining or modifying a characteristic includes measuring the response time of the at least one object.

15. The method of claim 14, wherein the first computer program code is a java swing application that implements a user interface of a java application.

16. The method of claim 15, wherein crosscutting includes a crosscut that defines a point in the first computer program code where a cross-cut action will be performed.

17. A computer-implemented method, comprising:
analyzing different code compilations of an application by receiving and storing response time data in one or more log files from the different code compilations of the application to determine a best code compilation from the different code compilations with a best response time to thereby generate the application using code corresponding to the best code compilation having the best response time, including:
binary weaving a second computer program code into a first computer program code stored in memory for each of the different code compilations of the application using a binary code weaver to form a third program product for each of the different code compilations of the application with a start point and a stop point, the binary weaving comprises:
  combining at least the first and second computer program codes to form a third computer program code of the third program product for each of the different code compilations of the application that includes code from the first and second computer program codes, the combining further comprising modifying an execution sequence to execute code from the second computer program code, the second computer program code comprising an abstract byte code that is inserted into an object class to form a concrete response time byte code that is tied to a start point and a corresponding stop point in the first computer program code for each of the different code compilations of the application based on receiving input from a user specifying where to insert the start and stop points;
  during the execution of the third program product for each of the different code compilations of the application between the start point and the corresponding stop point sending a request via a network requesting information from a server computer system;
  displaying output generated during execution of the third program product to the user including displaying information related to the inserted start and stop points to the user for each of the different code compilations of the application;
  measuring the time for each of the different code compilations of the application between the execution of the start point to the execution of the corresponding stop point, the measuring comprises:
    storing a first timestamp when the start point is executed into the one or more log files;
    storing a second timestamp when the corresponding stop point is executed into the one or more log files; and
    accessing the one or more log files and calculating the difference between the start timestamp and the end timestamp in the one or more log files and storing the result for each of the different code compilations of the application; and
  displaying the measured time for each of the different code compilations of the application to the user after displaying the information related to the inserted start and stop points to the user for each of the different code compilations of the application.

18. A system including instructions stored on a non-transitory computer-readable medium and executable by at least one processor, the system comprising:
  a computing device configured to cause the at least one processor to analyze different code compilations of an application by receiving and storing response time data in one or more log files from the different code compilations of the application to determine a best code compilation from the different code compilations with a best response time to thereby generate the application using code corresponding to the best code compilation having the best response time, the computing device including one or more modules for:
    sending a communication from a first computer system to a second computer system for each of the different code compilations of the application, the communication requesting information via a network for measuring a response time of portions of a first computer program code stored in memory for each of the different code compilations of the application;
    configuring the first computer program code for each of the different code compilations of the application using a second computer program code to initiate a timer when a start point is reached in the first computer program code and the timer is stopped when a stop point is reached in the first computer program code, the second computer program code inserting high level language code into a byte code of the first computer program code for each of the different code compilations of the application to create a woven program product for each of the different code compilations of the application with the start and stop points based on receiving input from a user specifying where to insert the start and stop points into the byte code, and the code between the start and stop points sends the communication from the first computer system to the second computer system via the network;
    displaying output generated by the woven program product for each of the different code compilations of the application to the user including a result of the information received from the second computer system related to the inserted start and stop points;
    calculating the response time for each of the different code compilations of the application and displaying the calculated response time for each of the different code compilations of the application to the user after displaying the result of the information received from the second computer system, the response time comprising both a first computer system execution time and a second computer system execution time for measuring the first and second computer system execution times between execution of the start point to execution of the stop point; and
    storing the response time for each of the different code compilations of the application as the response time data in the one or more log files.

19. A computer program product, the computer program product tangibly embodied on a non-transitory computer-readable storage medium and including instructions that, when executed by at least one processor, are configured to:
  analyze different code compilations of an application by receiving and storing response time data in one or more log files from the different code compilations of the application to determine a best code compilation from the different code compilations with a best response time to thereby generate the application using code corresponding to the best code compilation having the best response time, including instructions that are configured to:
    send a communication from a first computer system to a second computer system for each of the different code compilations of the application, the communication requesting information via a network for measuring a response time of portions of a first computer program code stored in memory for each of the different code compilations of the application;
    configure the first computer program code for each of the different code compilations of the application using a second computer program code to initiate a timer when a start point is reached in the first computer program code and the timer is stopped when a stop point is reached in the first computer program code, the second computer program code inserting high level language code into a byte code of the first computer program code for each of the different code compilations of the application to create a woven program product for each of the different code compilations of the application with the start and stop points based on receiving input from a user specifying where to insert the start and stop points into the byte code, and the code between the start and stop points sends the communication from the first computer system to the second computer system via the network;

display output generated by the woven program product for each of the different code compilations of the application to the user including a result of the information received from the second computer system related to the inserted start and stop points;

calculate the response time for each of the different code compilations of the application and displaying the calculated response time for each of the different code compilations of the application to the user after displaying the result of the information received from the second computer system, the response time comprising both a first computer system execution time and a second computer system execution time for measuring the first and second computer system execution times between execution of the start point to execution of the stop point; and store the response time for each of the different code compilations of the application as the response time data in the one or more log files.

* * * * *